United States Patent Office 3,584,124
Patented June 8, 1971

3,584,124
COMPOSITIONS FOR INHIBITING ANOMALOUS DEPOSITION AND MOBILIZATION OF CALCIUM PHOSPHATE IN ANIMAL TISSUE
Marion D. Francis, Springfield Township, Hamilton County, Ohio, assignor to The Procter & Gamble Company, Cincinnati, Ohio
No Drawing. Filed Dec. 24, 1968, Ser. No. 785,758
Int. Cl. A61k 27/00
U.S. Cl. 424—204   12 Claims

ABSTRACT OF THE DISCLOSURE

Compositions for inhibiting anomalous deposition and mobilization of calcium phosphates in animal tissue, comprising an effective amount of certain carboxyphosphonates as herein defined, and a pharmaceutical carrier; and a method for treating or preventing conditions involving pathological calcification and hard tissue demineralization in an animal comprising administering to such animal said compositions.

BACKGROUND OF THE INVENTION

This invention relates to novel compositions having therapeutic and/or prophylactic effects. The invention further relates to a novel method for treating or preventing certain pathological conditions in animals.

A number of pathological conditions which can afflict warm-blooded animals involve abnormal calcium and phosphate metabolism. Such conditions may be divided into two broad categories.

(1) Conditions which are characterized by anomalous mobilization of calcium and phosphate leading to general or specific bone loss or excessively high calcium and phosphate levels in the fluids of the body. Such conditions are sometimes referred to herein as pathological hard tissue demineralizations.

(2) Conditions which cause or result from deposition of calcium and phosphate anomalously in the body. These conditions are sometimes referred to herein as pathological calcifications.

The first category includes osteoporosis, a condition in which bone hard tissue is lost disproportionately to the development of new hard tissue. Marrow and bone spaces become larger, fibrous binding decreases, and compact bone becomes cancellous and fragile. Osteoporosis can be subclassified as menopausal, senile, drug induced (e.g., adrenocorticoid as can occur in steroid therapy), disease induced (e.g., arthritic and tumor), etc., however, the manifestations are essentially the same. Another condition in the first category is Paget's disease (osteitis deformans) which is also characterized by bone loss. In this disease, dissolution of normal bone occurs which is then replaced by soft, poorly mineralized tissue such that the bone becomes deformed from pressures of weight bearing, particularly in the tibia and femur. This condition also frequently sponsors pathological deposition of calcium and phosphate.

The second category, involving conditions manifested by anomalous calcium and phosphate deposition, includes such afflictions as arthritis, neuritis, bursitis, tendinitis and other inflammatory conditions which predispose involved tissue to deposition of calcium phosphates, and hormonal imbalance, e.g., hyperparathyrodism, myositis ossificans progressiva, calcinosis universalis, resulting in calcification of soft tissues. Atherosclerosis is another condition in this category and involves degeneration and proliferate change in the intima which produces fibrous, lipoid plaques. If such plaques calcify, or if the inner walls of the arteries accumulate plaque and calcify, this condition is commonly referred to as arteriosclerosis.

Yet another condition in category (2) which results from anomalous calcium and phosphate deposition is stone or calculi formation in the bile duct, gall bladder, pancreas, salivary glands, tonsils, kidneys and bladder. Although some of such stones are not comprised primarily of calcium phosphate, it is likely that the original nidus is calcium phosphate. The formation of urinary calculi, i.e., urolithiasis, in cattle and sheep constitutes a major problem in veterinary medicine. It is estimated that from 5% to 10% of weanling calves suffer this affliction when they are taken off milk and start taking in other fluids.

As far as is known, no satisfactory medical treatment for the conditions of category (1) as described above has been developed prior to this invention although dietary control, fluorides, estrogens, and the hormone calcitonin (thyrocalcitonin) have been suggested or used for these conditions. Although certain inorganic phosphates such as pyrophosphates and longer chain condensed phosphates have been suggested for treatment of conditions in category (2), they have not been widely used because of their tendency to hydrolyze to the ineffective orthophosphate when administered to larger animals such as humans and cattle.

It is therefore an object of this invention to provide a composition for inhibiting anomalous deposition and mobilization of calcium phosphate in animal tissue.

It is a further object of this invention to provide an improved method for treatment of conditions involving pathological calcification and hard tissue demineralization in animals.

Other objects of this invention will be obvious from consideration of the invention described more fully hereinafter.

SUMMARY OF THE INVENTION

This invention is based on the discovery that certain carboxyphosphonic acids and their pharmaceutically acceptable salts reduce anomalous mobilization and deposition of calcium phosphates in animals. The invention thus involves a composition and method for treating or preventing conditions involving pathological demineralization of bony tissue and pathological calcium deposition in the soft tissue of animals. In its method aspect, the invention comprises administering to said animals an effective amount of a carboxyphosphonate as hereinafter characterized.

DETAILED DESCRIPTION OF THE INVENTION

In one of its aspects, this invention is a composition comprising an effective but non-toxic amount of a carboxyphosphonic acid compound conforming to the structural formulae:

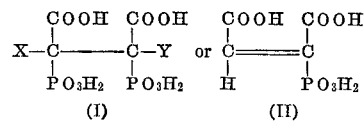

(I)  (II)

wherein X and Y are each hydrogen or hydroxy; or a pharmaceutically acceptable salt thereof such as alkali metal (e.g., sodium and potassium), alkaline earth metal (e.g., calcium and magnesium), non-toxic heavy metal (e.g., stannous and indium), and ammonium or low molecular weight substituted ammonium (e.g., mono-, di-, and triethanol ammonium) salts; and a pharmaceutical carrier. The above described carboxyphosphonic acids and their pharmacetuically acceptable salts are referred to collectively hereinafter as "carboxyphosphonates."

Operable carboxyphosphonates of the above Formula I include ethane-1,2-dicarboxy-1,2-diphosphonic acid; ethane-1,2-dicarboxy-1,2-dihydroxy - 1,2 - diphosphonic acid; ethane - 1,2 - dicarboxy-1-hydroxy-1,2-diphosphonic acid; and the pharmaceutically acceptable salts of these acids, e.g., sodium, potassium, calcium, magnesium, ammonium, triethanolammonium, diethanolammonium, and monoethanolammonium salts.

Among the operable carboxyphosphonates encompassed by the above Formula II are ethene-1,2-dicarboxy-1-phosphonic acid; and the pharmaceutically acceptable salts of these acids, e.g., sodium, potassium, calcium, magnesium, stannous, indium, ammonium, triethanolammonium, diethanolammonium, and monoethanolammonium salts. While the above Formula II is representative of cis-isomers, the corresponding trans-isomers are also useful herein. Reference hereinafter to ethene-1,2-dicarboxy-1-phosphonic acid or salts thereof, unless otherwise specified is intended as contemplating the cis- and trans-isomers and mixtures thereof.

Mixtures of any of the foregoing carboxyphosphonic acids and/or salts can be used in the practice of this invention.

Ethane-1,2-dicarboxy-1,2-diphosphonic acid, a preferred carboxyphosphonate herein, has the molecular formula $CH(COOH)(PO_3H_2)CH(COOH)(PO_3H_2)$. The most conveniently crystallizable salts of this acid are obtained when three, four or five of the acid hydrogens are replaced by sodium.

While any pharmaceutically acceptable salt of ethane-1,2-dicarboxy-1,2-diphosphonic acid can be used in the practice of this invention, the tetrasodium dihydrogen salt, the trisodium trihydrogen salt, the disodium tetrahydrogen salt, the monosodium pentahydrogen salt, and the mixtures thereof are preferred. The other sodium, potassium, ammonium, and mono-, di-, and triethanolammonium salts and mixtures thereof are also suitable, provided caution is observed in regulating the total intake of cation species in the salt composition.

Ethane-1,2-dicarboxy-1,2-diphosphonic acid and suitable salts thereof can be prepared in any convenient manner. For example, the reaction described by Pudovik in "Soviet Research on Organo-Phosphorus Compounds," 1949–1956, Part III, 547–85c can be used to prepare the ester of ethane-1,2-dicarboxy-1,2-diphosphonic acid which in turn can, by ordinary hydrolysis reactions, be converted to the free acid form. Neutralization by alkali compounds such as sodium hydroxide, potassium hydroxide, carbonates and the like can be used to prepare a desired salt of the acid. A more detailed description of the preparation of these compounds is described in the present applications of D. Allan Nicholson and Darrel Campbell, Ser. No. 786,766, filed Dec. 24, 1968, entitled "Built Detergent Compositions" and incorporated herein by reference.

Ethane-1,2-dicarboxy-1,2-dihydroxy-1,2 - diphosphonic acid and related compounds useful herein can be prepared by reaction of an ester of ethane-1,2-dicarboxy-1,2-diphosphonic acid and an alkali metal hypohalite followed by hydrolysis and saponification. This method is more fully described in the patent application of D. Allan Nicholson and Darrel Campbell, Ser. No. 786,765, filed Dec. 24, 1968, entitled "Ethane-1,2-Dicarboxy-1,2-Dihydroxy-1,2-Diphosphonic Acid, Lower Alkyl Esters, Alkali Metal Salts Thereof and Process for Preparing Same" and incorporated herein by reference.

Ethene-1,2-dicarboxy - 1 - phosphonic acid and related compounds useful herein can be prepared by reaction of an ester of acetylenedicarboxylic acid and a dialkyl phosphite followed by hydrolysis and saponification. This method is more fully described in the patent application of D. Allan Nicholson and Darrel Campbell, Ser. No. 786,764, filed Dec. 24, 1968, entitled "Ethene-1,2-Dicarboxy-1-Phosphonic Acid, Esters and Salts Thereof, and Process for Preparing Same" and incorporated herein by reference.

The required dosage of carboxyphosphonate will vary with the particular condition being treated, the severity of the condition, the duration of treatment, and the specific carboxyphosphonate employed; however, single dosages can range from 0.01 to 500 mg. per kilogram of body weight, preferably .5 to 50 mg./kg. (unless otherwise specified, the unit designated "mg./kg." as used herein refers to mg. of carboxydiphosphonate/kg. of body weight), with up to four dosages daily. The higher dosages within this range are, of course, required in the case of oral administration because of limited absorption. Dosages greater than about 500 mg./kg. may produce toxic symptoms or be emetic and should be avoided. Moreover, daily dosages greater than about 2000 mg./kg. are not required to produce the desired effect and may produce toxic side effects. Dosages of less than about .01 mg./kg. do not materially affect pathological calcification or demineralization, even administered intraveneously. Preferably, dosages ranging from 0.5 to 50 mg./kg. are employed when the polyphosphonates are administered orally. Table 1 below sets forth preferred dosages for various conditions which can be treated in accordance with this invention:

Table 1

| Condition: | Oral dosage (mg./kg.) up to four times/day [1] |
|---|---|
| Osteroporosis (menopausal) | 1–25 |
| Osteoporosis (senile et al.) | 1–25 |
| Paget's disease | 10–50 |
| Arthritis | 1–25 |
| Bursitis | 1–25 |
| Neuritis | 1–25 |
| Stones | 1–25 |

[1] A larger initial dosage may be required, e.g., up to 500 mg./kg. followed by the specified dosage level.

The carboxyphosphonate can also be administered parenterally in aqueous or solution by subcutaneous, intradermal, intramuscular or intravenous injection. The preferred dosage ranges by these modes of administration are as follows:

| | Mg./kg. |
|---|---|
| Subcutaneous | 0.1–10 |
| Intradermal | 0.1–10 |
| Intramuscular | .05–5 |
| Intravenous | .05–5 |

For purposes of oral administration the carboxyphosphonates can be formulated in the form of capsules, tablets or granules. For treatment of non-human animals, the carboxyphosphonates are preferably incorporated in animal feed, feed supplements or feed concentrates. They can also be prepared in unit dosage form together with a pharmaceutical carrier, each unit dosage form containing from 15 mg. to 10 g. of carboxyphosphonate. The preferred concentration range of carboxyphosphonate in unit dosage forms intended for use by humans and smaller domesticated animals is from 15 mg. to 1000 mg., more preferably 100 mg. to 500 mg. A higher concentration range, i.e., from 1 g. to 5 g. is preferred in unit dosage forms intended for treatment of larger animals such as cattle, horses, etc.

When administered orally, the compositions of this invention are preferably in a form adapted to minimal exposure of the carboxyphosphonates to the oral cavity.

Although these compounds do not damage dental enamel when applied to the tooth surfaces at the relatively low concentrations typical of toothpaste, mouthwash, lozenges and the like intended for dental calculus prophylaxis, the substantially higher concentrations of carboxyphosphonates provided in the unit dosage form embodiments of this invention may demineralize dental enamel on repeated prolonged exposure. Thus oral administration is preferably effected with such unit dosage forms as capsules, pills, and tablets which are promptly ingested. Troches, chewable tablets and the like which typically remain in the oral cavity for a substantial time prior to ingestion are preferably avoided.

As used herein, the term "pharmaceutical carrier" denotes a solid or liquid filler diluent or encapsulating substance. Some examples of the substances which can serve as pharmaceutical carriers are sugars such as lactose, glucose and sucrose; starches such as corn starch and potato starch; cellulose and its derivatives, such as sodium carboxymethylcellulose; ethylcellulose, cellulose acetate; powdered tragacanth; malt; gelatin; talc; stearic acid; magnesium stearate; calcium sulfate vegetable oils, such as peanut oil, cottonseed oil, sesame oil, olive oil, corn oil and oil of theobroma polyols usch as propylene glycol, glycerin, sorbitol, mannitol, and polyethylene glycol; agar; alginic acid; pyrogen-free water; isotonic saline; and phosphate buffer solutions, as well as other non-toxic compatible substances used in pharmaceutical formulations. Wetting agents and lubricants such as sodium lauryl sulfate, as well as coloring agents, flavoring agents and preservatives, can also be present.

The pharmaceutical carrier employed in conjunction with the carboxyphosphonates is used at a concentration sufficient to provide a practical size to dosage relationship. Preferably, the pharmaceutical carrier comprises from about 0.1% to 99% by weight of the total composition.

Animal feed compositions to which the carboxyphosphonates of this invention can be added generally include as feedstuffs a cellulosic roughage component such as hay, straw, cottonseed hulls, beet pulp, silage, ground corn cobs, corn stalks, etc. Protein-containing components such as whole grains, including corn, wheat, barley, oats, rye, millet and alfalfa; processed grains, including cottonseed meal, corn meal, soybean meal, linseed meal and other waste products from the oil expressing industry; animal protein including casein, gelatin, fish meal, and slaughterhouse wastes, are also required feedstuffs for a nutritionally feed composition. Animal feed compositions can also contain natural oils, including animal fats, such as beef tallow, mutton tallow; fish oils, including eel, herring, menhaden, tuna and salmon oil; and whale oil. Vegetable oils such as soybean oil, sunflower oil, olive oil, safflower oil, corn oil, peanut oil, cottonseed oil, rice oil, millet oil, wheat germ oil and palm oil, can also be used.

In addition to the feedstuffs mentioned above, animal feed compositions can include supplemental sources of minerals, such as bone meal, salt, and the various trace minerals, such as salts of zinc, copper, manganese, magnesium, cobalt, iodine and iron. Antibiotics, steroids, anthelmintics and other medicants or growth stimulating substances can be incorporated in animal feeds. Various vitamins can be added to animal feed compositions to provide for deficiencies incident to the selection of other feed components. Other feedstuffs can be included such as casein, other milk by-products, and synthetic nitrogen sources such as urea.

The carboxyphosphonates can be incorporated in the total feed composition as described above or in intermediate feed concentrates or feed supplements which are adapted to be blended with the basic roughage and protein feedstuffs to prepare the final feed. In the feed industry the term "concentrate" is often used to denote a product which contains a relatively large quantity of one or more nutrients, such as high quality protein, minerals, vitamins and the like and which is adapted for addition to the basic feedstuffs to form a total or final feed. The term "supplement" is also used to denote a specific feedstuff or mixture thereof that is either added to or included in the concentrate portion of the total feed, or in the total feed itself. The carboxyphosphonates can be employed in accordance with this invention by incorporating same in feed supplements, concentrates or the total feed composition (all referred to hereinafter as "feed compositions").

Feed compositions containing a minor proportion of one or more of the carboxyphosphonates described herein incorporated in a major proportion of an animal foodstuff constitute a preferred embodiment of this invention inasmuch as they provide an effective and practical means of urolithiasis prophylaxis for large herds of animals, especially during periods of feed-lot maintenance or limited grazing. Urolithiasis prophylaxis can be achieved in grazing herds by incorporating the carboxyphosphonates in block salt.

The concentration of carboxyphosphonate in feed compositions will of course vary with the weight of the animal to be treated and the proportion of the total diet which the feed composition comprises. When herds of animals are to be treated, the level of carboxyphosphonate in the feed composition should be sufficient to provide the dosages specified herein based on the average feed consumption and weight of the animals. In any event, the carboxyphosphonates comprise a minor proportion of the total feed composition.

While it is not intended that this invention be limited by a particular theory of operation, in the case of those conditions which cause or result from deposition of calcium and phosphate anomalously in the body, it is believed that the carboxyphosphonates interfere with the conversion of X-ray amorphous calcium phosphate to crystalline calcium hydroxylapatite and thus greatly reduce or prevent the formation of calcium phosphate deposits. This phenomenon, i.e. interference with crystalline calcium hydroxylapatite, is not to be confused with the phenomenon of sequestration. Compounds having excellent sequestering properties may or may not inhibit the formation of crystalline calcium hydroxylapatite. Although certain inorganic polyphosphates also inhibit crystal growth soon after administration to an animal, they are hydrolyzed to the orthophosphate species which has no crystal growth inhibition properties and, in fact, can itself take part in hydroxylapatite formation. The carboxyphosphonates of this invention, on the other hand, are stable to hydrolysis and remain active after administration, even to larger animals such as cattle.

CRYSTAL GROWTH INHIBITION TEST

The efficacy of the carboxyphosphonates of this invention in inhibiting crystal growth is demonstrated by the Crystal Growth Inhibition Test which is conducted as follows:

1 ml. of a 0.1 M stock solution of $NaH_2PO_4 \cdot H_2O$ is diluted with 22 ml. of distilled water. 1 ml. of an aqueous solution of the carboxyphosphonate to be tested (at a concentration sufficient to provide the desired ultimate concentration in the reaction mixture) is added to the diluted $NaH_2PO_4$ solution and the solution is adjusted to pH 7.4 with sodium hydroxide. To this solution is added 1 ml. of a 0.1 M solution of $CaCl_2 \cdot 2H_2O$ pre-adjusted to pH 7.4 with sodium hydroxide. This mixture is held at a constant pH 7.4 throughout the reaction period.

After a sufficient reaction time as determined by the operator, generally within 90 minutes, the solution is filtered through a $0.45\mu$ Millipore filter pad. The precipitate is air-dried and analyzed by X-ray diffraction. The solid calcium phosphate precipitated from the above-described solution without a carboxyphosphonate gives a typical hydroxylapatite pattern, while the calcium phosphate precipitated under the same conditions but in the presence of small amounts of the carboxyphosphonates of this invention is amorphous to X-rays.

Those compounds which were effective in inhibiting the growth of hydroxylapatite crystals at concentrations of less than $1.5 \times 10^{-3}$ M under the conditions of this test are found to inhibit anomalous mobilization and deposition of calcium phosphates in animal tissue, while several compounds outside the scope of this invention that have little or no effect in this test are ineffective in vivo.

Table 2 below shows the concentration of various preferred carboxyphosphonates required to inhibit the formation of calcium hydroxylapatite under the conditions specified above.

Table 2

| Compound: | M concentration for inhibition |
|---|---|
| Ethane - 1,2 - dicarboxy - 1,2 - diphosphonic acid pentasodium salt | $1.94 \times 10^{-4}$ |
| Ethane - 1,2 - dicarboxy - 1,2 - dihydroxy - 1,2 - diphosphonic acid, tetrasodium salt | $2.03 \times 10^{-4}$ |
| Ethene - 1,2 - dicarboxy - 1 - phosphonic acid trisodium salt (85:15 cis:trans isomers) | $2.04 \times 10^{-4}$ |

The presence of the specified amounts of the carboxyphosphonates of Table 2 in the test solutions of the Crystal Growth Inhibition Test results in the formation of an amorphous calcium phosphate rather than crystalline calcium hydroxylapatite as occurs without carboxyphosphonate and the total formation of calcium orthophosphate is greatly decreased.

The capacity of the carboxyphosphonates of this invention to inhibit anomalous calcification can be demonstrated in vivo as follows:

This test is based on the observation that massive dosages of vitamin $D_3$ induces extensive calcification in the aorta of rats [see Gillman et al., J. Exp. Path., 40:1 (1960).]. Female Wistar rats each weighing 150 to 200 g. are randomly divided into a control group of 60 animals and test groups each containing 10 animals. The animals are kept in a thermostabilized room at 22° C. and receive a normal diet and tap water ad libitum throughout the test period. All of the animals are given daily doses of 75,000 units/kg. of vitamin $D_3$ via stomach tube for five days beginning on the third and ending on the seventh day of the test. Beginning on the first day (prior to the first dosage of vitamin $D_3$) until the conclusion of the test, the test groups of animals are administered specified dosages of various carboxyphosphonates, orally by stomach tube and subcutaneously, respectively, once per day. In each case, the carboxyphopshonates are dissolved in 0.9% NaCl when given at the lower dose, and in distilled water when given at the higher dosage. The solution is adjusted to pH 7.4 and the amount of solution given is 2 ml./kg. of body weight. On the fifteenth day the animals are sacrificed and their aortas are dissected and dried for 48 hours at 120° C. After determination of the dry weight, the aortas are ashed in a muffle oven at 800° C. for six hours. The residue is dissolved in 0.2 N HCl and the calcium is titrated with EDTA using calcichrome as an indicator in a titration photometer, all in accordance with the methods described by Irving et al., Proc. Soc. Exp. Biol. Med., 122, #3, 852 (1966).

The compositions of this invention materially reduce vitamin $D_3$-induced calcification in the aorta of rats.

The capacity of carboxyphosphonates of this invention to inhibit pathological hard tissue demineralizations can be demonstrated in the Mouse Calvaria Test. This test is based on the observation that carboxyphosphonate compounds of the invention inhibit bone resorption. The appreciable bone resorption induced by addition of 0.1 units/ml. of parathyroid hormone to a synthetic tissue culture medium containing the calvaria from two- to three-day old mice can be inhibited by the incorporation into the tissue culture of a carboxyphosphonate compound described hereinbefore. The mouse calvaria are incubated for five days in a synthetic medium described by H. B. Fell, "Techniques of Bone Cultivation" in Methods in Medical Research, Vol. 4, M. B. Visscher (Ed.), Year Book Publishers, Inc. 1951, p. 235, to which is added 5% by weight of inactivated horse serum. The induced bone resorption is microscopically assessed daily and at the end of the test after fixation and staining with silver nitrate by a point-counting method using a grid. The significance of the differences in the resorption induced by parathyroid extract in the presence and in the absence of carboxyphosphonate is determined by Student's t test.

EXAMPLE I

Capsules are prepared by conventional methods, comprised as follows:

| Ingredient: | Mg. per capsule |
|---|---|
| Ethane-1,2-dicarboxy-1,2-diphosphonic acid | 350.00 |
| Starch | 55.60 |
| Sodium lauryl sulfate | 2.90 |

The above capsules administered orally twice daily substantially reduces bone decalcification in a patient weighing approximately 70 kilograms afflicted with osteoporosis. Similar results are attained when ethane-1,2 - dicarboxy - 1,2 - dihydroxy - 1,2 - diphosphonic acid; ethane - 1,2 - dicarboxy - 1 - hydroxy - 1,2 - diphosphonic acid; and ethene - 1,2 - dicarboxy - 1 - phosphonic acid respectively, are employed in the above described capsule in place of ethane-1,2-dicarboxy-1,2-diphosphonic acid.

EXAMPLE II

Tablets are prepared by conventional methods, formulated as follows:

| Ingredient: | Mg. per tablet |
|---|---|
| Ethane - 1,2 - dicarboxy - 1,2 - dihydroxy-1,2 - disphosphonic acid | 25.00 |
| Lactose | 40.00 |
| Starch | 2.50 |
| Magnesium stearate | 1.00 |

When administered orally four times daily, the above composition significantly reduces the formation of renal calculi in a patient weighing approximately 50 kilograms, having a predisposition to such formation.

Similar results are achieved with tablets formulated as above but replacing ethane-1,2 - carboxy-1,2 - dihydroxy-1,2-diphosphonic acid with the disodium salt of ethane-1,2-dicarboxy-1,2-diphosphonic acid; the trisodium salt of ethane - 1,2 - dicarboxy-1,2-dihydroxy-1,2-diphosphonic acid; the disodium salt of ethane-1,2-dicarboxy-1-hydroxy-1,2-diphosphonic acid; the monocalcium salt of ethene-1,2-dicarboxy-1-phosphonic acid; the tetrasodium salt of ethane-1,2-dicarboxy - 1,2-diphosphonic acid; the monoindium salt of ethane 1,2-dicarboxy - 1,2 - diphosphonic acid; the monostannous salt of ethane-1,2-dicarboxy-1-hydroxy-1,2-diphosphonic acid; and the monocalcium salt of ethane 1,2-dicarboxy-1,2-dihydroxy-1,2-diphosphonic acid, respectively.

The lactose employed in this example is replaced by sucrose and the magnesium stearate by sodium carboxymethylcellulose without affecting the desired properties of the tablet.

Additional tablet compositions are prepared in accordance with the invention as follows:

| Example No. | Mg. per tablet | | | | | | |
|---|---|---|---|---|---|---|---|
| | III | IV | V | VI | VII | VIII | IX |
| Ingredient: | | | | | | | |
| Tetrasodium salt of ethane-1,2-dicarboxy-1,2-diphosphonic acid | 80.0 | | | | | | |
| Pentasodium salt of ethane-1,2-dicarboxy-1,2-dihydroxy-1,2-diphosphonic acid | | 100.0 | | | | | |
| Dimagnesium salt of ethane-1,2-dicarboxy-1,2-diphosphonic acid | | | 120.0 | | | | |
| Pentasodium salt of ethane-1,2-dihydroxy-1-phosphonic acid | | | | 50.0 | | | 25.0 |
| Pentasodium salt of ethane-1,2-dicarboxy-1-hydroxy-1,2-diphosphonic acid | | | | | 85.0 | | 25.0 |
| Ethane-1,2-dicarboxy-1,2-diphosphnic acid | | | | | | 30.0 | |
| Lactose | 97.0 | 31.0 | 31.0 | 73.0 | 97.0 | 30.0 | 30.0 |
| Starch | 45.0 | 13.0 | 13.0 | 57.0 | 45.0 | | |
| Stearic acid | | | | 6.0 | | | |
| Talc | 35.5 | 6.5 | 6.5 | 9.0 | 35.0 | 5.0 | 5.0 |
| Calcium stearate | | 1.0 | 1.0 | | | 1.0 | 1.0 |
| Ethyl cellulose | | 16.0 | 16.0 | | | 15.0 | 15.0 |

Solutions for parenteral administration are prepared by dissolving the following phosphonates in distilled water at the specified concentration, adjusting the pH to 7.4 with the base corresponding to the indicated salt form, or sodium hydroxide in the case of the acids and sterilizing same by standard sterilization techniques.

| Example | Carboxyphosphonate | Conc., mg./ml. |
|---|---|---|
| X | Trisodium salt of ethane-1,2-dicarboxy-1,2-diphosphonic acid. | 10.0 |
| XI | Monopotassium salt of ethane-1,2-dicarboxy-1,2-diphosphonic acid. | 15.0 |
| XII | Diammonium salt of ethane-1,2-dicarboxy-1-hydroxy-1,2-diphosphonic acid. | 5.0 |
| XIII | Bis(triethanolammonium) salt of ethane-1,2-dicarboxy-1,2-diphosphonic acid. | 25.0 |
| XIV | Disodium salt of ethene-1,2-dicarboxy-1-phosphonic acid. | 13.0 |
| XV | Diammonium salt of ethane-1,2-dicarboxy-1,2-dihydroxy-1,2-diphosphonic acid. | 18.0 |
| XVI | Ethene-1,2-dicarboxy-1-phosphonic acid. | 8.0 |
| XVII | Monopotassium salt of ethene-1,2-dicarboxy-1-phosphonic acid. | 24.0 |
| XVIII | Monoammonium salt of ethene-1,2-dicarboxy-1-phosphonic acid. | 6.0 |
| XIX | Monoammonium salt of ethane-1,2-dicarboxy-1,2-dihydroxy-1,2-diphosphonic acid. | 17.0 |
| XX | Monomagnesium salt of ethane-1,2-dicarboxy-1-hydroxy-1,2-diphosphonic acid. | 23.0 |
| XXI | Ethane-1,2-dicarboxy-1-hydroxy-1,2-diphosphonic acid. | 8.0 |
| XXII | Monocalcium salt of ethane-1,2-dicarboxy-1,2-diphosphonic acid. | 25.0 |

The solutions of the foregoing examples when administered by injection to animals in an amount sufficient to provide desired dosage levels as hereinbefore specified substantially reduces pathological calcification and hard tissue demineralization. Preferably, the solutions are packaged in sealed ampules for single dosage hypodermic injections.

EXAMPLE XXIII

A complete feed composition embodying the present invention is prepared by grinding and mixing the following:

| Component: | Parts by weight |
|---|---|
| Timothy hay | 960 |
| Dehydrated alfalfa | 40 |
| Yellow corn | 600 |
| Corn starch | 300 |
| Iodized salt | 10 |
| Bone meal | 20 |
| Sea salt | 2 |
| Soybean meal | 30 |
| Biuret | 28 |
| Disodium salt of ethane-1,2-dicarboxy-1,2-diphosphonic acid | .694 |

This composition is fed to 400 pound weanling steers at the rate of approximately 12 pounds per day. The average dosage of carboxyphosphonate effected in this manner is about 1.9 g. per day. Animals placed on this feed experience a substantially lower incidence of urolithiasis than control animals receiving the same feed but without carboxyphosphonate.

Similar results are attained when ethane-1,2-dicarboxy-1,2-diphosphonic acid; ethane-1,2-dicarboxy-1-hydroxy-1,2-diphosphonic acid; ethane-1,2-dicarboxy-1,2-dihydroxy-1,2-diphosphonic acid; and ethene-1,2-dicarboxy-1-phosphonic acid, respectively, are employed in the above described feed composition in place of the disodium salt of ethane-1,2-dicarboxy-1,2-diphosphonic acid.

EXAMPLE XXIV

A supplementary feed concentrate is prepared by intimately admixing the following:

| Component: | Parts by weight |
|---|---|
| Biuret | 400 |
| Brewers' dried grains | 25 |
| Dehydrated alfalfa | 43 |
| Iodized salt | 10 |
| Tricalcium phosphate | 2 |
| Ethane-1,2-dicarboxy-1,2-diphosphonic acid | 4 |

This composition is suitable for mixing with silage, grain hay, ground grain and the like for preparing total feed compositions for ruminant livestock. When fed as a supplement to legumes consumed by grazing weanling lambs at the rate of 0.25 pound per day, this supplement greatly reduces the incidence of urolithiasis.

Similar results are achieved with a feed concentrate formulated as above but replacing ethane-1,2-dicarboxy-1,2-diphosphonic acid with the disodium salt of ethane-1,2-dicarboxy-1,2-dihydroxy-1,2-diphosphonic acid; the trisodium salt of ethene-1,2-dicarboxy-1-phosphonic acid; the disodium salt of ethane-1,2-dicarboxy-1-hydroxy-1,2-diphosphonic acid; the monocalcium salt of ethane-1,2-dicarboxy-1,2-diphosphonic acid; the monoindium salt of ethane-1,2-dicarboxy-1,2-diphosphonic acd; and the monostannous salt of ethene-1,2-dicarboxy-1-phosphonic acid, respectively.

What is claimed is:

1. A composition in unit dosage form for inhibiting anomalous deposition and mobilization of calcium phosphate in animal tissue comprising (1) an effective but nontoxic amount, within the range from about 15 milligrams to 1000 milligrams, of a carboxyphosphonate selected from the group consisting of

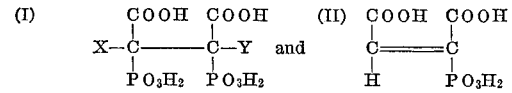

wherein X and Y are each hydrogen or hydroxy, and the pharmaceutically acceptable salts thereof; and (2) a pharmaceutical carrier.

2. The composition of claim 1 wherein the carboxyphosphonate is ethane-1,2 - dicarboxy-1,2-diphosphonic acid or a pharmaceutically acceptable salt thereof.

3. The composition of claim 1 wherein the carboxyphosphonate is ethane - 1,2 - dicarboxy-1,2-dihydroxy-1,2-diphosphonic acid or a pharmaceutically acceptable salt thereof.

4. The composition of claim 1 wherein the carboxyphosphonate is ethane - 1,2 - dicarboxy-1-phosphonic acid or a pharmaceutically acceptable salt thereof.

5. A method for treating conditions involving pathological calcification and hard tissue demineralization in animals which comprises administering to said animals an effective but non-toxic amount of a carboxyphosphonate selected from the group consisting of those of the formulae:

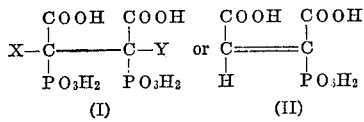

wherein X and Y are each hydrogen and hydroxy; and the pharmaceutically acceptable salts thereof.

6. The method of claim 5 wherein the carboxyphosphonate is ethane-1,2-dicarboxy-1,2-diphosphonic acid or a pharmaceutically acceptable salt thereof.

7. The method of claim 5 wherein the carboxyphosphonate is ethane-1,2-dicarboxy-1,2-dihydroxy-1,2-diphosphonic acid or a pharmaceutically acceptable salt thereof.

8. The method of claim 5 wherein the carboxyphosphonate is ethane-1,2-dicarboxy-1-phosphonic acid or a pharmaceutically acceptable salt thereof.

9. An animal feed composition comprising a minor and non-toxic proportion of a carboxyphosphonate selected from the group consisting of those of the formulae:

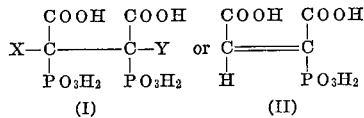

wherein X and Y are each hydrogen and hydroxy; and the pharmaceutically acceptable salts thereof, and a major proportion of animal foodstuff.

10. The composition of claim 9 wherein the carboxyphosphonate is ethane-1,2-dicarboxy-1,2-diphosphonic acid or a pharmaceutically acceptable salt thereof.

11. The composition of claim 9 wherein the carboxyphosphonate is ethane-1,2-dicarboxy-1,2-dihydroxy-1,2-diphosphonic acid or a pharmaceutically acceptable salt thereof.

12. The composition of claim 9 wherein the carboxyphosphonate is ethene-1,2-dicarboxy-1-phosphonic acid or a pharmaceutically acceptable salt thereof.

No references cited.

RICHARD L. HUFF, Primary Examiner

U.S. Cl. X.R.

424—222

PO-1050
(5/69)

UNITED STATES PATENT OFFICE
CERTIFICATE OF CORRECTION

Patent No. 3,584,124     Dated June 8, 1971

Inventor(s) Marion D. Francis

It is certified that error appears in the above-identified patent and that said Letters Patent are hereby corrected as shown below:

Column 9, line 60, "300" should read -- 310 --.

Column 10, line 47, "acd" should read -- acid --.

Column 11, line 10, "or" should read -- and --.

Column 11, line 14, "and" should read -- or --.

Column 12, line 4, "or" should read -- and --.

Column 12, line 8, "and" should read -- or --.

Signed and sealed this 21st day of December 1971.

(SEAL)
Attest:

EDWARD M. FLETCHER, JR.
Attesting Officer

ROBERT GOTTSCHALK
Acting Commissioner of Patents